(12) United States Patent
Mason et al.

(10) Patent No.: US 11,884,413 B2
(45) Date of Patent: Jan. 30, 2024

(54) OPERATING A VEHICLE WITH ROTORS WHILE AVOIDING A BAND OF ROTOR ROTATIONAL SPEED

(71) Applicant: The Boeing Company, Chicago, IL (US)

(72) Inventors: David H. Mason, Glenmoore, PA (US); Eric L. Hathaway, Springfield, PA (US); Roger W. Lacy, West Chester, PA (US); Brandon R. Brown, Malvern, PA (US); Michael J. Duffy, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 17/644,499

(22) Filed: Dec. 15, 2021

(65) Prior Publication Data
US 2023/0182915 A1 Jun. 15, 2023

(51) Int. Cl.
*B64C 27/00* (2006.01)
*B64D 31/06* (2006.01)
*B64C 29/00* (2006.01)
*B64C 27/08* (2023.01)

(52) U.S. Cl.
CPC ............. *B64D 31/06* (2013.01); *B64C 27/08* (2013.01); *B64C 29/0025* (2013.01); *B64C 2027/004* (2013.01)

(58) Field of Classification Search
CPC ........ B64D 31/06; B64D 31/02; B64C 27/08; B64C 29/0025; B64C 2027/004; B64U 10/16; B64U 50/23; B64U 2101/60; B64U 2201/10; B64U 2201/20
See application file for complete search history.

(56) References Cited

U.S. PATENT DOCUMENTS

| 10,889,383 B2 * | 1/2021 | Randall ................... B64C 27/20 |
| 2020/0277082 A1 * | 9/2020 | Grohmann ............. B64D 45/00 |
| 2021/0188426 A1 * | 6/2021 | Li ......................... B64C 39/024 |

* cited by examiner

*Primary Examiner* — Ian Jen
(74) *Attorney, Agent, or Firm* — Quinn IP Law

(57) ABSTRACT

A method is provided for operating a vehicle that includes rotors driven by actuators to cause the vehicle to move. The method includes determining rotational speeds at which to drive the rotors to achieve a controlled movement of the vehicle. The rotational speeds include a rotational speed for a rotor of a pair of the rotors driven by a pair of the actuators. The method includes monitoring the rotational speed to detect that the rotational speed has approached or reached a defined avoid band of rotational speeds, and biasing the rotational speed to produce at least one biased rotational speed for respective rotors of the pair that is outside the defined avoid band. The method includes generating commands for the actuators based on the rotational speeds, and modifying the commands including those of the commands for the pair of the actuators based on the at least one biased rotational speed.

20 Claims, 12 Drawing Sheets

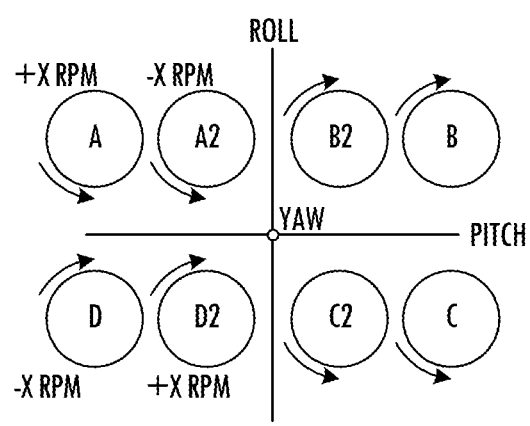
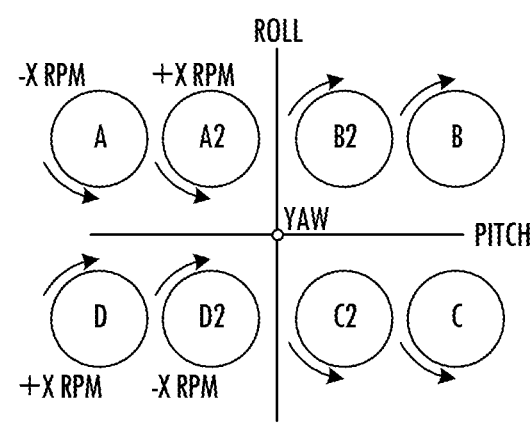
FIG. 9A
FIG. 9B

OPERATING A VEHICLE WITH ROTORS WHILE AVOIDING A BAND OF ROTOR ROTATIONAL SPEED

TECHNOLOGICAL FIELD

The present disclosure relates generally to robotics and, in particular, to one or more of the design, construction, operation or use of robots such as vehicles that include rotors driven by actuators to cause the vehicles to move.

BACKGROUND

Many modern robots and other machines are designed to operate with increased autonomy and are less reliant on well-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

For some robots implemented as a vehicle such as a UAV, rotors are driven by actuators to cause the vehicle to move. Those rotors that lift the vehicle may generate vibratory forces and moments at multiple harmonics of the rotor speed. Many configurations of vehicle achieve flight control with variable-speed actuators to modulate thrust of these rotors. But as the rotor speed is varied through the vehicle's flight envelope, harmonic vibratory forces generated by the rotor may come into resonance with rotor natural frequencies. This resonance, occurring at some critical rotor speed, may amplify rotor loads that are reacted by its driving actuator and the supporting airframe structure. The increased loads at resonance may reduce the usable life of components, result in increased aircraft structural weight if components are designed to carry the load, or drive restricted flight operations.

It would therefore be desirable to have a system and method that takes into account at least some of the issues discussed above, as well as other possible issues.

BRIEF SUMMARY

Example implementations of the present disclosure are directed to vehicles that include rotors driven by actuators that cause the vehicles to move, such as by providing lift. Example implementations of the present disclosure incorporate a defined avoid band of rotational speeds, and a function that operates to reduce the time that the rotors spend operating at or near the particular rotor speed at which the rotor's vibratory forces come into resonance with rotor natural frequencies. This may be accomplished by adjustment of the commands for the rotors to bias rotational speed so that the resulting biased rotational speed is outside the defined avoid band.

A number of rotorcraft or other similar vehicles, the rotors may act in pairs (or representative pairs) to control the vehicle with minimal off-axis coupling. Rotors may be paired for any of a number of reasons, such as to offset a torque change from a thrust (or rotational speed) change, thereby reducing if not eliminating yaw coupling. For a pair of rotors, then, adjustment of the commands for the rotors may include increasing the rotational speed of one of the rotors of the pair, and correspondingly decreasing the rotational speed of the other of the rotors of the pair. The increase and decrease in rotational speed may be balanced to minimize a net effect on control of the vehicle.

The present disclosure thus includes, without limitation, the following example implementations.

Some example implementations provide an apparatus for operating a vehicle that includes rotors driven by actuators to cause the vehicle to move, the apparatus comprising: a memory configured to store computer-readable program code; and processing circuitry configured to access the memory, and execute the computer-readable program code to cause the apparatus to at least: determine rotational speeds at which to drive the rotors to achieve a controlled movement of the vehicle, the rotational speeds including a rotational speed for a rotor of a pair of the rotors driven by a pair of the actuators; monitor the rotational speed to detect that the rotational speed has approached or reached a defined avoid band of rotational speeds; bias the rotational speed to produce at least one biased rotational speed for respective rotors of the pair that is outside the defined avoid band; generate commands for the actuators based on the rotational speeds; modify the commands including those of the commands for the pair of the actuators based on the at least one biased rotational speed; and send the commands to the actuators to cause the actuators to drive the rotors according to the commands, and including those of the commands that are modified so that the pair of the actuators are caused to drive the respective rotors at the at least one biased rotational speed, instead of at the rotational speed.

Other example implementations provide a method for operating a vehicle that includes rotors. And yet other example implementations provide a computer-readable storage medium for operating a vehicle that includes rotors.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 9A and 9B illustrate pairs of rotors for the UAVs of FIGS. 6 and 7, and FIGS. 10A, 10B and 10C illustrate an arrangement of rotors for the UAV of FIG. 8, to show how various rotors may be biased according to some example implementations;

DETAILED DESCRIPTION

Figure 1:
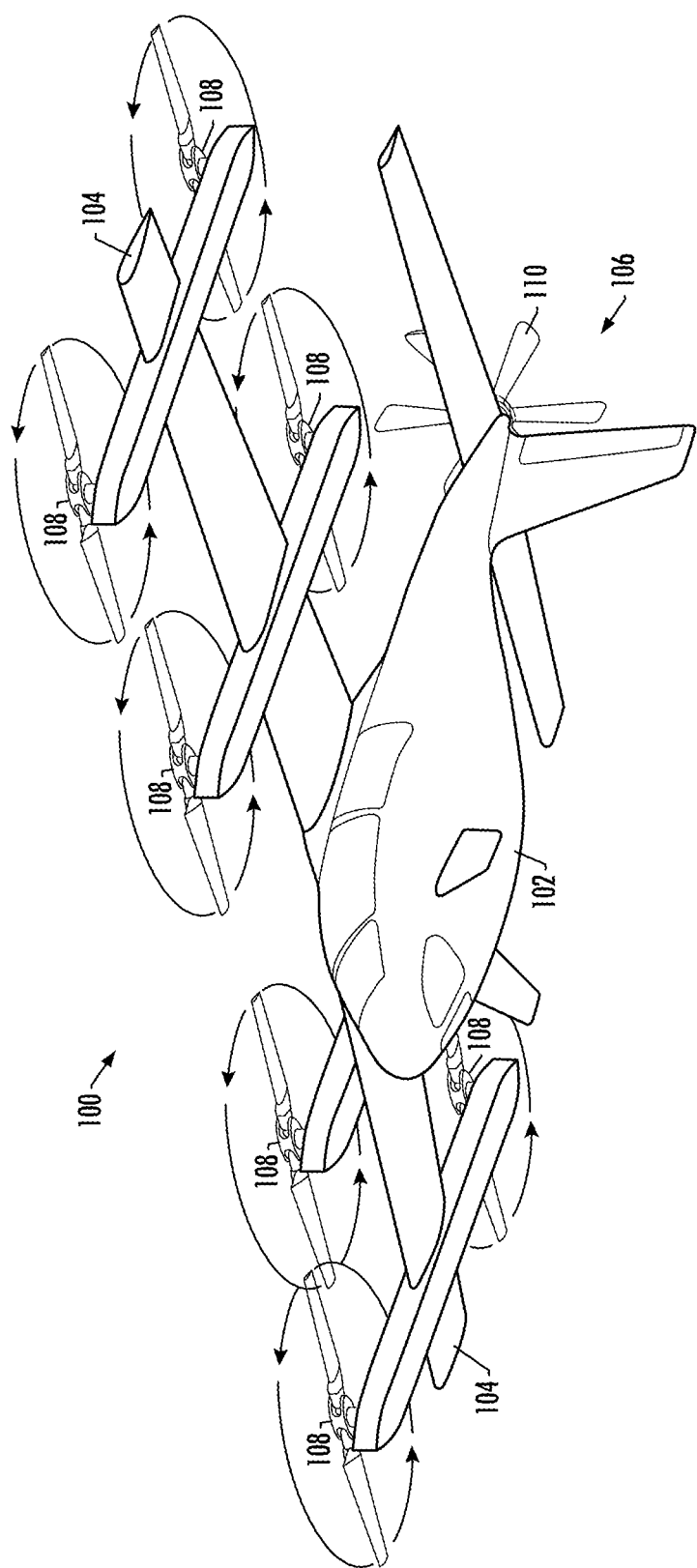
FIG. 1 illustrates one type of robot implemented as a vehicle, namely, an unmanned aerial vehicle (UAVs), that may benefit from example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot. A robot designed and configurable to operate with at least some level of autonomy may at times be referred to as an autonomous robot, or an autonomous aerial robot in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

FIG. 1 illustrates one type of robot implemented as a vehicle, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. Rotors 108 and 110 driven by respective actuators are mounted to respectively the wings and the end of the tail assembly for lifting and propelling the UAV during flight (and thereby causing the UAV to move).

Figure 2:
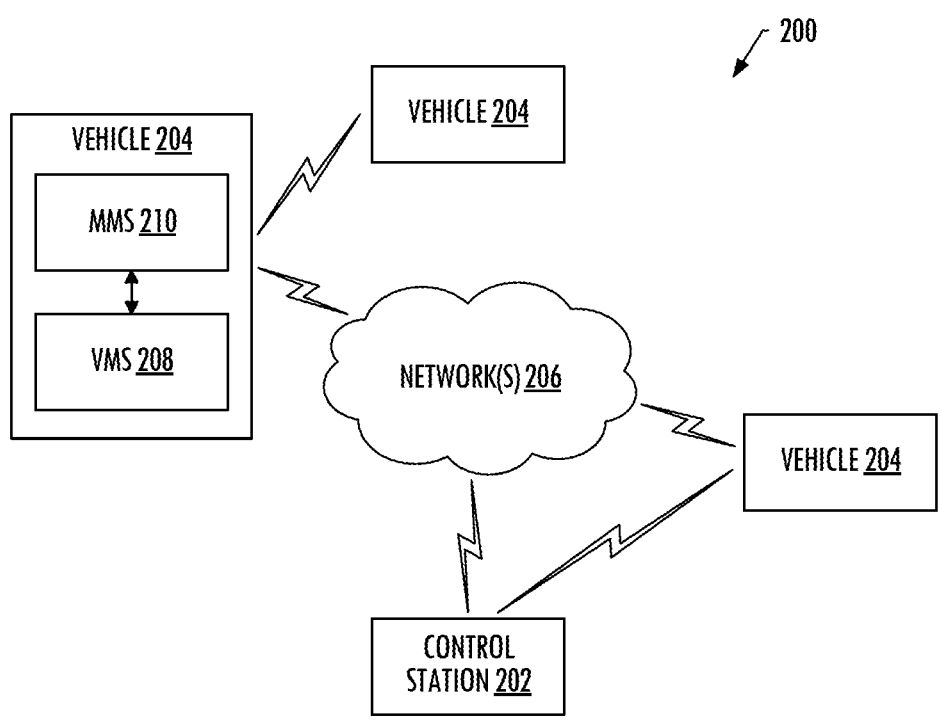
FIG. 2 illustrates a system including one or more vehicles, according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more vehicles 204 (e.g., one or more UAVs 100). The control station provides facilities for communication with or control of the one or more vehicles, such as by wired or wireless data links directly or across one or more networks 206. In some examples, the control station may be a ground station, and not in all cases control the vehicles. In this regard, the control station may be configured to monitor the vehicles. The control station may initiate mission, but the control station may not control the vehicles to maneuver. At times, then, the control station may enable or provide a distributed network/server of software functions.

The vehicles 204 includes a vehicle management system (VMS) 208 and a mission management system (MMS) 210. The VMS is a vehicle-specific subsystem configured to manage subsystems and other components of the vehicle. These subsystems and other components include, for example, maneuver controls, landing gear, onboard environmental systems, electrical, pneumatic and hydraulic systems, communications systems, navigation systems and other subsystems and components for controlling operation and maneuvering of the vehicle. The VMS is configured to accept maneuver commands such as waypoints and/or steering commands, and control the vehicle to follow those maneuver commands.

The MMS 210 is a subsystem configured to manage missions of the vehicle 204. A mission is a deployment of the vehicle (one or more vehicles) to achieve one or more mission objectives. A mission may be decomposed into maneuvers of the vehicle with optional sensor and/or effector scheduling, and the MMS may execute tasks to manage the vehicle to execute maneuvers with specific parameters and capabilities. The MMS 210 includes subsystems to process sensor data to situational awareness, plan tasks for the vehicle 204 (or multiple vehicles), coordinate with teams to assign tasks, execute assigned tasks. The MMS is also configured to interface with the VMS 208, and in some examples the control station 202. Although the MMS is shown on the vehicle 204, the MMS may instead be at the control station; or in some examples, the MMS may be distributed between the vehicle and the control station.

In some examples, the MMS 210 provides a complete, end-to-end autonomy architecture with open system architecture standards and parameterized to allow rapid extension and reapplication to a variety of vehicles. The flexibility of the MMS enables an operator to code it once, but to apply it anywhere. The MMS may therefore be applied to virtually any vehicle that applies, or benefits from, autonomy. The MMS may include an adaptable autonomy architecture that is applicable to a variety of vehicles, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

Figure 3:
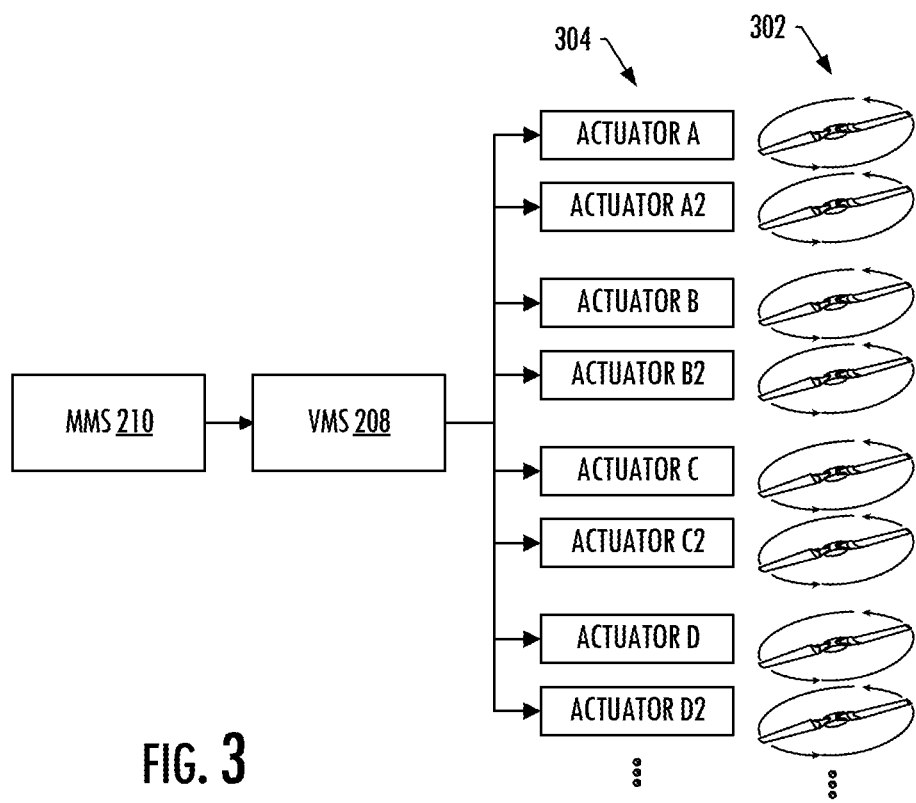
FIG. 3 illustrates components of a vehicle of the one or more vehicles shown in FIG. 2, including rotors driven by actuators to cause the vehicle to move, according to some example implementations.

According to some example implementations of the present disclosure, the vehicle 204 includes rotors driven by actuators to cause the vehicle to move, such as in the case of UAV 100. In this regard, the FIG. 3 illustrates the VMS 208 and MMS 210 of the vehicle, along with its rotors 302 and actuators 304, according to some examples. As shown, the vehicle includes at least eight actuators (labeled A, A2, B, B2, C, C2, D and D2) to drive respective ones of at least eight rotors. It should be understood, however, that the vehicle may include more or less than eight actuators and rotors. In another particular example, the vehicle may include six actuators to drive respective ones of six rotors.

The VMS 208 may receive control input that indicates a controlled movement of the vehicle 204. This may include the VMS configured to accept maneuver commands (e.g., waypoints, steering commands) from the MMS 210. The VMS may also receive measurements of the vehicle's attitude (roll, pitch, yaw), position and heading from one or more sensors with which the VMS is equipped, such as an inertial measurement unit (IMU), accelerometers, gyroscopes, magnetometers and the like. The VMS may then use the control input and measurements to generate commands for the actuators 304 to cause the actuators to drive the rotors 302 to achieve the controlled movement.

For a number of vehicles that include rotors to provide lift, the rotors generate vibratory forces and moments at multiple harmonics of the rotor speed. Many configurations of vehicle achieve flight control with variable-speed actuators to modulate thrust of these rotors. But as the rotor speed is varied through the vehicle's flight envelope, harmonic vibratory forces generated by the rotor may come into resonance with rotor natural frequencies. This resonance, occurring at some particular rotor speed, may amplify rotor loads that are reacted by its driving actuator and the supporting airframe structure. The increased loads at resonance may reduce the usable life of components, result in increased aircraft structural weight if components are designed to carry the load, or drive restricted flight operations.

The VMS 208 of some example implementations therefore incorporates a defined avoid band of rotational speeds, and a function that operates to reduce the time that the rotors 302 spend operating at or near the particular rotor speed at which the rotor's vibratory forces come into resonance with rotor natural frequencies. The VMS may accomplish this by adjustment of the commands for the rotors to bias rotational speed so that the resulting biased rotational speed is outside the defined avoid band. For a pair of rotors, this may include increasing the rotational speed of one of the rotors of the pair, and correspondingly decreasing the rotational speed of the other of the rotors of the pair. The increase and decrease in rotational speed may be balanced to minimize a net effect on control of the vehicle 204.

For a vehicle 204 with eight or more rotors, pairs of rotors may be identified in advance to operate together, and reduce if not eliminate operating dwell times on resonant rotor speeds. In some examples, a hysteresis loop command may be used to manage change commands along the boundaries of the defined avoid band. In other examples in which the vehicle includes six rotors, a similar approach may be used but perhaps with further biasing of the commands for more than just a pair of the rotors to maintain desired flight path control.

In some more particular example implementations of the present disclosure, then, the VMS 208 is configured to determine rotational speeds at which to drive the rotors 302 to achieve the controlled movement of the vehicle 204. This may include the VMS configured to receive the control input that indicates the controlled movement of the vehicle, determine the attitude of the vehicle, and determine the rotational speeds based on the control input and the attitude of the vehicle. The rotational speeds may be expressed in a number of different manners such as in terms of revolutions per minute (rpms). The rotational speeds include a rotational speed for a rotor of a pair of the rotors driven by a pair of the actuators 304 (e.g., A, A2).

Figure 4:
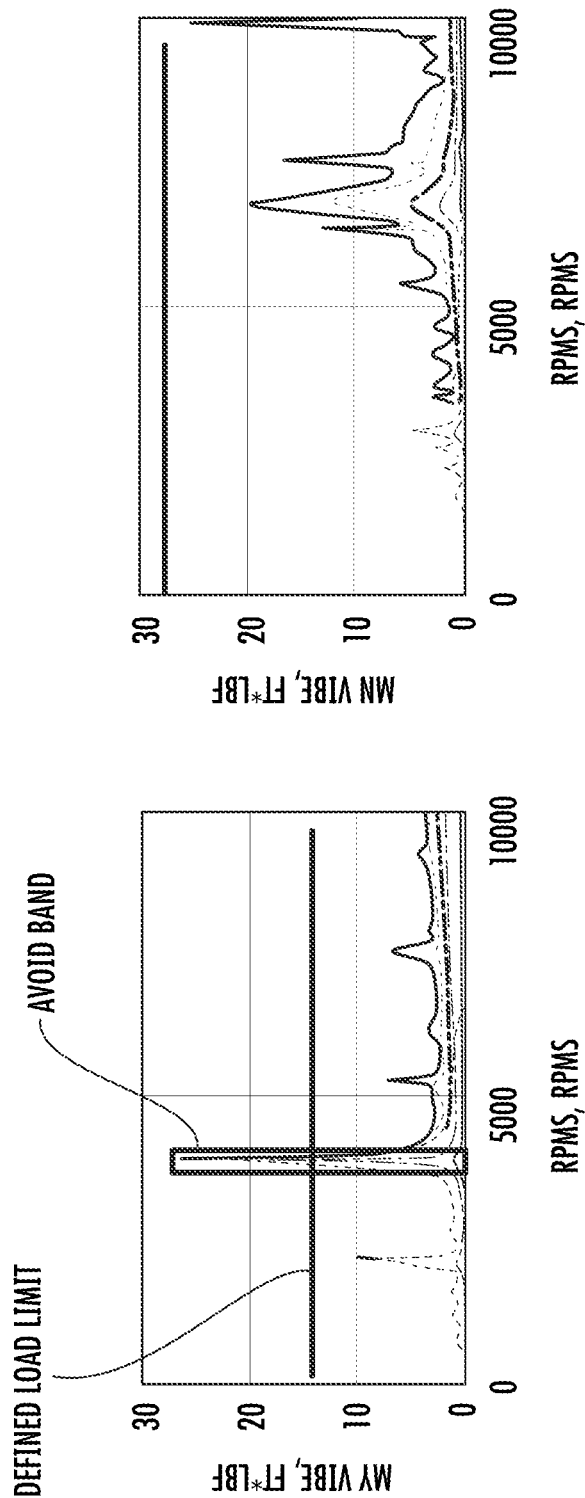
FIG. 4 illustrates charts showing vibratory moments generated by rotors over a number of rotational speeds for the vehicle at a number of airspeeds, and including a defined load limit and an avoid band where a defined load limit is exceeded, according to some example implementations.

The VMS 208 is configured to monitor the rotational speed to detect that the rotational speed has approached or reached a defined avoid band of rotational speeds. In this regard, the defined avoid band of rotational speeds may be defined to include the rotational speeds at which rotor loads exceed a defined load limit, caused by harmonic vibratory forces generated by the rotors at the rotational speeds being in resonance natural frequencies of the rotors. Defining the avoid band, then, may include a test or analysis to define dynamic loads as a function of flight conditions and rotor rotational speed, and identifying those of the flight conditions where the dynamic loads exceed one or more structural fatigue and endurance limits (indicated by the defined load limit). The flight conditions may then be reviewed to identify a reduced if not minimal split that satisfies the flight conditions. FIG. 4 illustrates charts showing vibratory moments on Y and Z axes, generated by rotors over a number of rotational speeds for the vehicle 204 at a number of airspeeds, and including a defined load limit and an avoid band where the defined load limit is exceeded.

The VMS 208 is configured to bias the rotational speed to produce at least one biased rotational speed for respective rotors 302 of the pair that is outside the defined avoid band.

This may include an increase of the rotational speed by an amount to produce a first of the biased rotational speeds (for one of the respective rotors), and a decrease of the rotational speed by the amount to produce a second of the biased rotational speeds (for the other of the respective rotors).

The VMS is configured to generate commands for the actuators 304 based on the rotational speeds, and modify the commands including those of the commands for the pair of the actuators based on the at least one biased rotational speed. The VMS is in turn configured to send the commands to the actuators 304 to cause the actuators to drive the rotors according to the commands. This includes those of the commands that are modified so that the pair of the actuators are caused to drive the respective rotors at the at least one biased rotational speed, instead of at the rotational speed.

Figure 5:
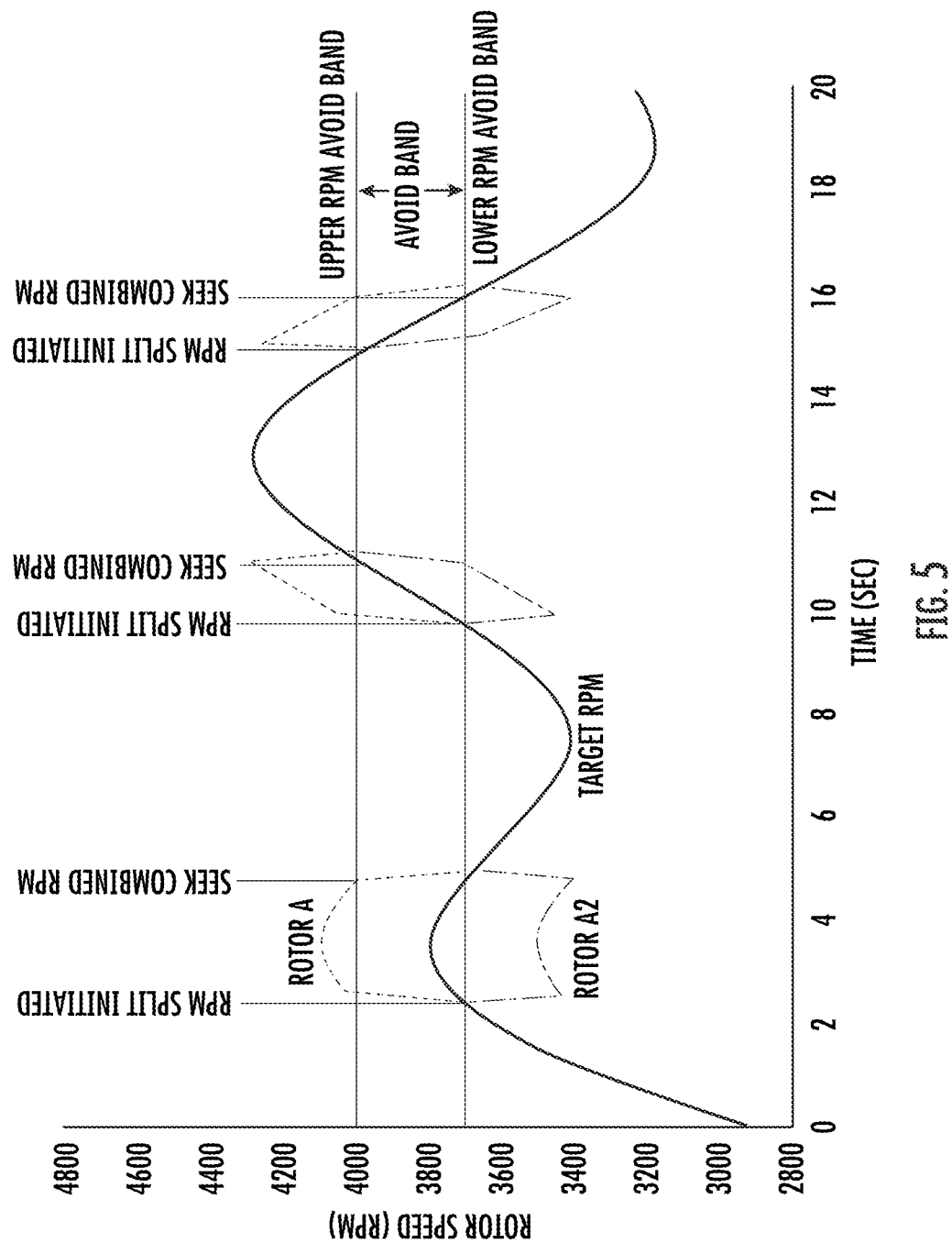
FIG. 5 illustrates an avoid band and an impact of a biased rotational speed over time relative to the avoid band, according to some example implementations.

FIG. 5 illustrates an avoid band and an impact of the at least one biased rotational speed over time, according to some example implementations. As shown, in some examples, the rotational speed is biased an amount that is defined based on a width of the defined avoid band, with an additional margin on either end of the defined avoid band, which may account for hysteresis and help manage change commands along the boundaries of the defined avoid band. As also shown, the defined avoid band may be bounded by a first rotational speed (e.g., upper RPM avoid band—up) and a second rotational speed (e.g., lower RPM avoid band—down). In some of these examples, the first of the biased rotational speeds (shown for actuator A) may be closer to the first rotational speed than the second rotational speed of the defined avoid band, and a second of the biased rotational speeds (shown for actuator A2) is closer to the second rotational speed than the first rotational speed.

According to some further example implementations, the VMS 208 is also configured to bias a second rotational speed for a second pair of the rotors 302 to produce at least one second biased rotational speed for respective rotors of the second pair of the rotors. In some examples the biased rotational speed(s) for the pair of rotors include a first increased rotational speed and a first decreased rotational speed; and the second biased rotational speed may similarly includes a second increased rotational speed and a second decreased rotational speed. The modification of the commands to the actuators may then include the VMS configured to also modify those of the commands for the second pair of the actuators 304 based on the at least one second biased rotational speed. This modification may be made in a manner similar to those of the commands for the pair of the actuators as earlier described.

Figure 6:
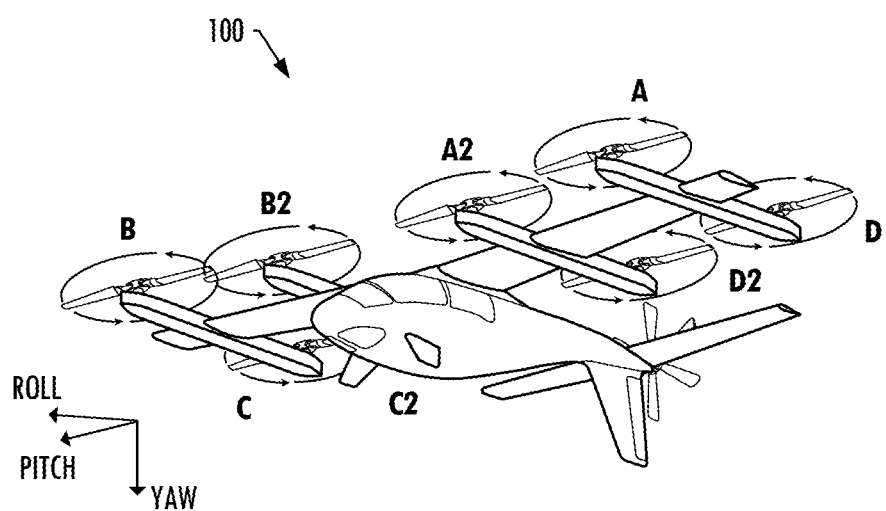
FIGS. 6, 7 and 8 illustrate UAVs with respective arrangements of rotors, according to example implementations.
Figure 7:
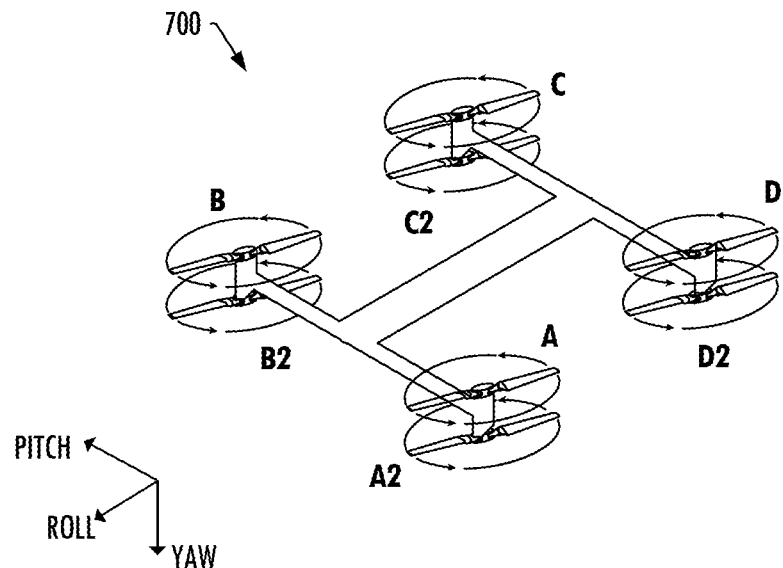
Figure 8:
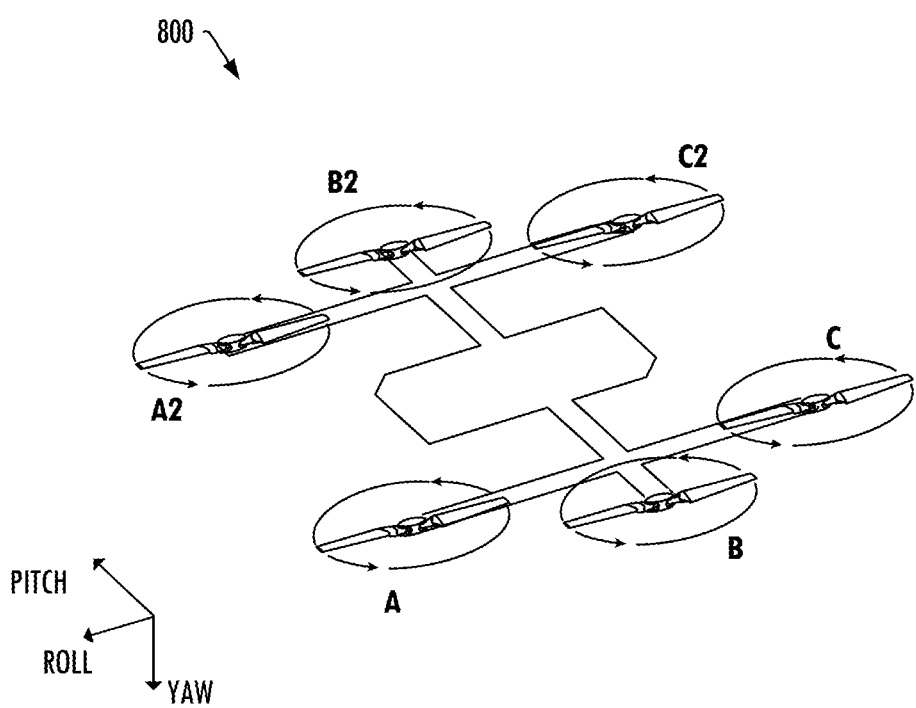

To further illustrate example implementations of the present disclosure, FIG. 6 illustrates the UAV 100 of FIG. 1 as one example of a suitable vehicle 204. As shown, the vehicle includes eight actuators and rotors, with the rotors labeled according to the actuators shown in FIG. 3 that may drive respective ones of the rotors, according to some examples. The rotors in this example have an in-plane arrangement in which the rotors share a common plane. FIG. 7 illustrates another, similar UAV 700 with eight rotors in a coaxial arrangement in which pairs of the rotors are coaxial with one another, and which are labeled in a manner similar to those in FIG. 6. The rotors here are also labeled according to the actuators shown in FIG. 3 that may drive respective ones of the rotors. And FIG. 8 illustrates yet another UAV 800 with six rotors that are also in an in-plane arrangement.

As explained above, the VMS 208 may detect that the rotational speed for a rotor 302 of a pair of the rotors has approached or reached the defined avoid band; and in response, the VMS may bias the rotational speed to produce biased rotational speed(s) for respective rotors of the pair that is outside the defined avoid band. In some examples, the respective rotors of the pair are immediately adjacent rotors in a direction of a yaw axis, a pitch axis or a roll axis of the vehicle 204. The sides of the vehicle may be defined with respect to the roll axis of the vehicle, and the respective rotors of the pair of the rotors may be immediately adjacent and located on one side of the vehicle, or on respective sides of the vehicle.

As shown in FIG. 6, for example, the pair of rotors may be those labeled A:A2, B:B2, C:C2 or D:D2 that are immediately adjacent in the direction of the pitch axis of the UAV 100, and on one side of the UAV. In FIG. 7, the pair of rotors may be those labeled A:A2, B:B2, C:C2 or D:D2 that are immediately adjacent in the direction of the yaw axis of the UAV 700, and on one side of the UAV. In FIG. 8, the pair of rotors may be those labeled A:A2, B:B2 or C:C2 that are immediately adjacent in the direction of the pitch axis of the UAV 800, but on respective sides of the UAV.

In various examples in which the (second) rotational speed for the second pair of the rotors 302 is also biased, the respective rotors of the second pair may be located with respect to one another similar to those of the first pair of the rotors. Similarly, the pair of the rotors may be immediately adjacent the second pair of the rotors in the direction of the yaw axis, pitch axis or roll axis, on one side or on respective sides of the vehicle 204.

In some examples, the pair of the rotors 302 includes a first rotor and a second rotor that are immediately adjacent respective ones of a third rotor and a fourth rotor of the second pair in a direction of a roll axis of the vehicle 204. As shown in FIG. 6 (and similarly FIG. 7), for example, the pair of rotors may include a first rotor labeled A, and a second rotor labeled A2; and the second pair may include a third rotor labeled D, and a fourth rotor labeled D2. In FIG. 8, the pair of rotors may include a first rotor labeled A, and a second rotor labeled A2; and the second pair may include a third rotor labeled B, and a fourth rotor labeled B2.

Figure 10A:
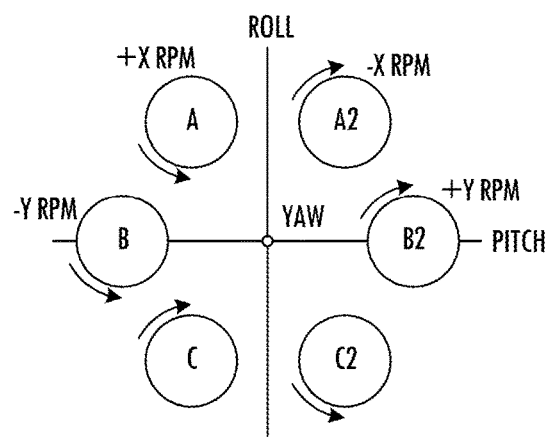
Figure 10B:
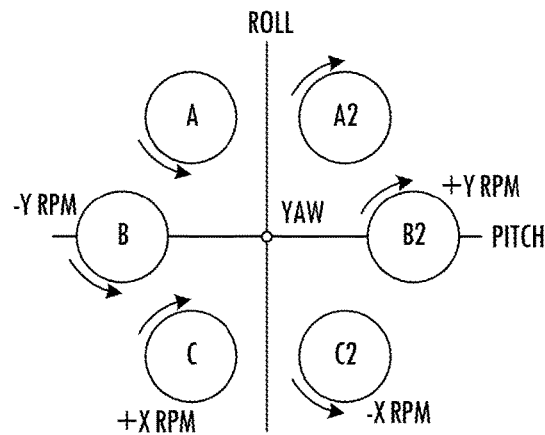
Figure 10C:
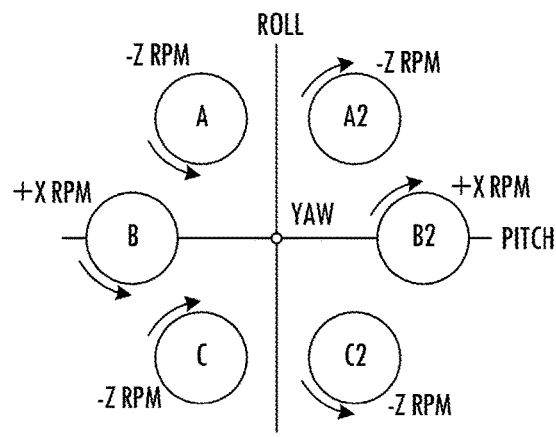

FIGS. 9A and 9B illustrate pairs of rotors for UAVs 100 and 700, and FIGS. 10A-10C illustrate an arrangement of rotors for UAV 800, to show how various rotors may be biased according to some example implementations. As shown in FIG. 9A, a first rotor A and a second rotor A2 may be driven to respectively the first increased rotational speed and the first decreased rotational speed; and a third rotor D and a fourth rotor D2 may be driven to respectively the second decreased rotational speed and the second increased rotational speed. Conversely, as shown in FIG. 9B, a first rotor D2 and a second rotor D may be driven to respectively the first increased rotational speed and the first decreased rotational speed; and a third rotor A2 and a fourth rotor A may be driven to respectively the second decreased rotational speed and the second increased rotational speed.

In some examples, the first increased rotational speed and the first decreased rotational speed differ from the rotational speed by a first amount x (e.g., at least the width of the defined avoid band), and the second increased rotational speed and the second decreased rotational speed differ from the second rotational speed by a second amount that is equal to the first amount. As shown in FIGS. 9A and 9B, this may be the case for the UAVs 100 and 700 in FIGS. 6 and 7.

As shown in FIG. 10A for the UAV 800 in FIG. 8, a first rotor A and a second rotor A2 may be driven to respectively the first increased rotational speed and the first decreased rotational speed (to balance pitch of the UAV); and a third rotor B and a fourth rotor B2 may be driven to respectively the second decreased rotational speed and the second increased rotational speed (to balance roll of the UAV). Similarly, in FIG. 10B, a first rotor C and a second rotor C2 may be driven to respectively the first increased rotational speed and the first decreased rotational speed; and again, the third rotor B and the fourth rotor B2 may be driven to respectively the second decreased rotational speed and the second increased rotational speed. In these examples, the first amount x and the second amount y by which the rotational speeds are respectively increased and decreased may be different amounts.

Further, as shown in FIG. 10C, the rotational speed of a first pair of rotors B:B2 may both be driven to a first increased rotational speed (to balance roll of the UAV 800). In this example, a second pair of rotors that includes a third rotor A and a fourth rotor A2 may be driven to a first decreased rotational speed that is decreased by a different amount than the increase of the first increased rotational speed. And further, a third pair of rotors that includes a fifth rotor C and a sixth rotor C2 may be driven to a third decreased rotational speed that is decreased by the same amount as the second decreased speed. In this example, the rotational speeds of the second and third pairs of rotors may be decreased to balance thrust of the UAV.

Figure 11A:
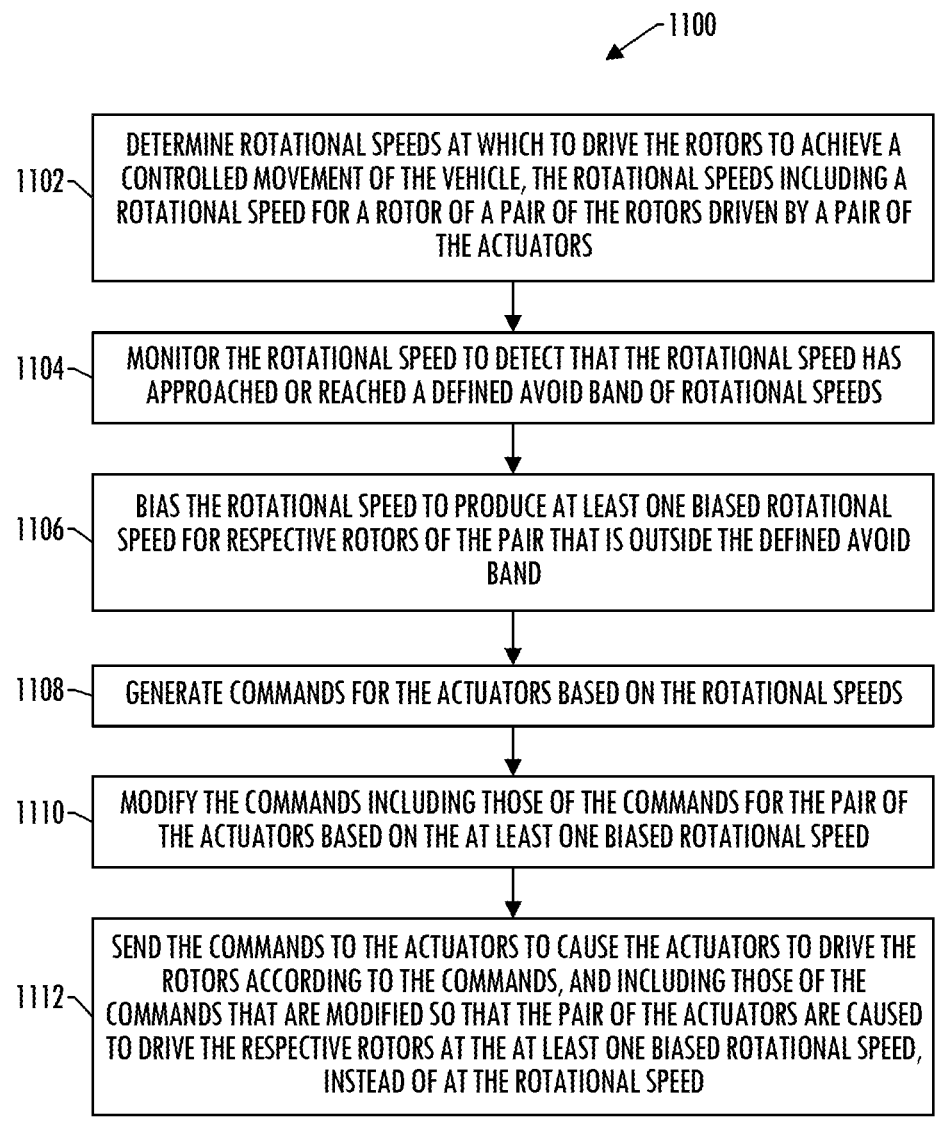
FIGS. 11A, 11B and 11C are flowcharts illustrating various steps in a method of operating a vehicle that includes rotors driven by actuators to cause the vehicle to move, according to example implementations.
Figure 11B:
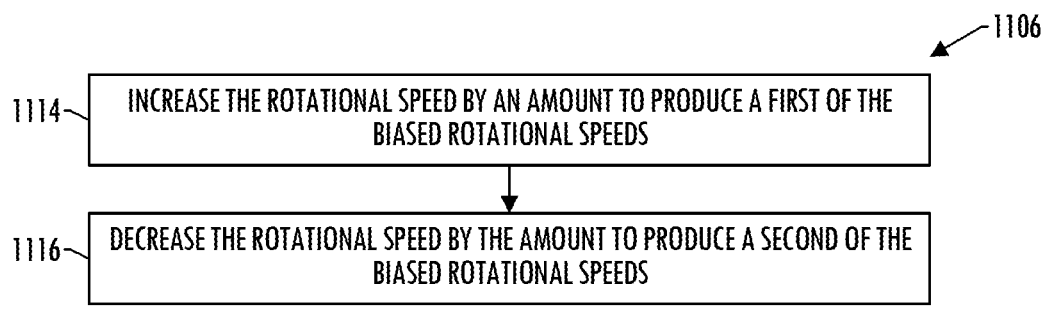
Figure 11C:
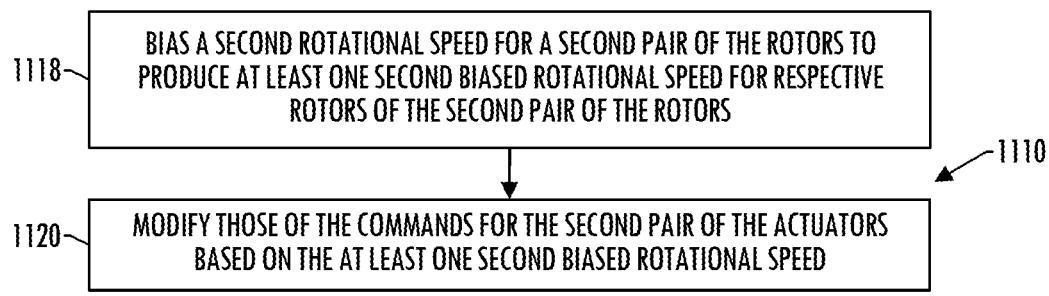

FIGS. 11A-11C are flowcharts illustrating various steps in a method 1100 of operating a vehicle that includes rotors driven by actuators to cause the vehicle to move, according to various example implementations of the present disclosure. The method includes determining rotational speeds at which to drive the rotors to achieve a controlled movement of the vehicle, the rotational speeds including a rotational speed for a rotor of a pair of the rotors driven by a pair of the actuators, as shown at block 1102 of FIG. 11A. The method includes monitoring the rotational speed to detect that the rotational speed has approached or reached a defined avoid band of rotational speeds, as shown at block 1104.

The method includes biasing the rotational speed to produce at least one biased rotational speed for respective rotors of the pair that is outside the defined avoid band, as shown at block 1106. The method includes generating commands for the actuators based on the rotational speeds, as shown at block 1108. The method includes modifying the commands including those of the commands for the pair of the actuators based on the at least one biased rotational speed, as shown at block 1110. And the method includes sending the commands to the actuators to cause the actuators to drive the rotors according to the commands, and including those of the commands that are modified so that the pair of the actuators are caused to drive the respective rotors at the at least one biased rotational speed, instead of at the rotational speed, as shown at block 1112.

In some examples, the pair of the rotors are immediately adjacent rotors in a direction of a yaw axis or a pitch axis of the vehicle.

In some examples, sides of the vehicle are defined with respect to a roll axis of the vehicle, and the respective rotors of the pair of the rotors are immediately adjacent and located on one side of the vehicle.

In some examples, sides of the vehicle are defined with respect to a roll axis of the vehicle, and the respective rotors of the pair of the rotors are immediately adjacent and located on respective sides of the vehicle.

In some examples, the defined avoid band of rotational speeds is defined to include the rotational speeds at which rotor loads exceed a defined load limit, caused by harmonic vibratory forces generated by the rotors at the rotational speeds being in resonance natural frequencies of the rotors.

In some examples, the rotational speed is biased at block 1106 an amount that is defined based on a width of the defined avoid band, with an additional margin on either end of the defined avoid band.

In some examples, the at least one biased rotational speed includes biased rotational speeds for the respective rotors of the pair that are outside the defined avoid band, and biasing the rotational speed at block 1106 includes increasing the rotational speed by an amount to produce a first of the biased rotational speeds, as shown at block 1114 of FIG. 11B. In some of these examples, biasing the rotational speed also includes decreasing the rotational speed by the amount to produce a second of the biased rotational speeds, as shown at block 1116.

In some examples, the method 1100 further includes biasing a second rotational speed for a second pair of the rotors to produce at least one second biased rotational speed for respective rotors of the second pair of the rotors, as shown at block 1118 of FIG. 11C. In some of these examples, modifying the commands further at block 1110 includes modifying those of the commands for the second pair of the actuators based on the at least one second biased rotational speed, as shown at block 1120.

In some examples, the pair of the rotors are immediately adjacent the second pair of the rotors in a direction of a roll axis of the vehicle, sides of the vehicle are defined with respect to the roll axis, and the pair and the second pair of the rotors are located on one side of the vehicle.

In some examples, the pair of the rotors are immediately adjacent the second pair of the rotors in a direction of a roll axis of the vehicle, sides of the vehicle are defined with respect to the roll axis, the respective rotors of the pair of the rotors are located on respective sides of the vehicle, and the respective rotors of the second pair of the rotors are located on the respective sides of the vehicle.

In some examples, the at least one biased rotational speed includes a first increased rotational speed and a first decreased rotational speed, and the at least one second biased rotational speed includes a second increased rotational speed and a second decreased rotational speed.

In some examples, the pair of the rotors includes a first rotor and a second rotor that are immediately adjacent respective ones of a third rotor and a fourth rotor of the second pair in a direction of a roll axis of the vehicle. In some of these examples, the first rotor and the second rotor are driven to respectively the first increased rotational speed and the first decreased rotational speed, and the third rotor and the fourth rotor are driven to respectively the second decreased rotational speed and the second increased rotational speed.

According to example implementations of the present disclosure, the VMS 208, the MMS 210 and their respective subsystems may be implemented by various means. Means for implementing the VMS, MMS and their respective subsystems may include hardware, alone or under direction of one or more computer programs from a computer-readable storage medium. In some examples, one or more apparatuses may be configured to function as or otherwise implement one or more of the VMS, MMS or their respective subsystems shown and described herein. In examples involving more than one apparatus, the respective apparatuses may be connected to or otherwise in communication with one another in a number of different manners, such as directly or indirectly via a wired or wireless network or the like.

Figure 12:
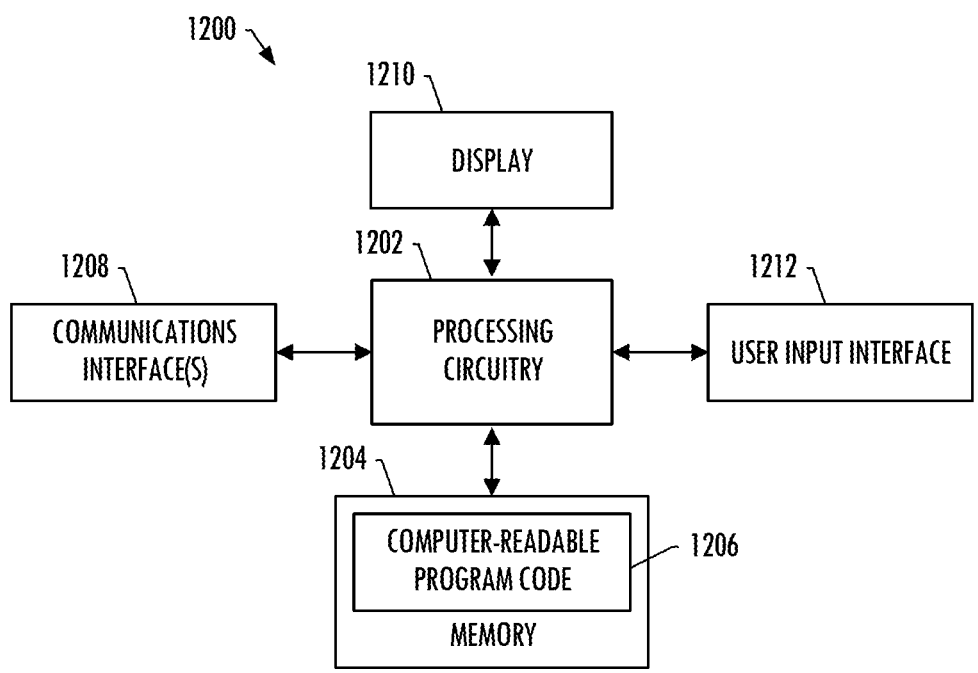
FIG. 12 illustrates an apparatus according to some example implementations.

FIG. 12 illustrates an apparatus 1200 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1202 (e.g., processor unit) connected to a memory 1204 (e.g., storage device).

The processing circuitry 1202 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1204 (of the same or another apparatus).

The processing circuitry 1202 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1204 is generally any piece of computer hardware that is capable of storing information such as, for example, data, computer programs (e.g., computer-readable program code 1206) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1204, the processing circuitry 1202 may also be connected to one or more interfaces for displaying, transmitting and/or receiving information. The interfaces may include a communications interface 1208 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1210 and/or one or more user input interfaces 1212 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1200 may include a processing circuitry 1202 and a computer-readable storage medium or memory 1204 coupled to the processing circuitry, where the processing circuitry is configured to execute computer-readable program code 1206 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for operating a vehicle that includes rotors driven by actuators to cause the vehicle to move, the apparatus comprising: a memory configured to store computer-readable program code; and processing circuitry configured to access the memory, and execute the computer-readable program code to cause the apparatus to at least: determine rotational speeds at which to the rotors to achieve a controlled movement of the vehicle, the rotational speeds including a rotational speed for a rotor of a pair of the rotors driven by a pair of the actuators; monitor the rotational speed to detect that the rotational speed has approached or reached a defined avoid band of rotational speeds; bias the rotational speed to produce at least one biased rotational speed for respective rotors of the pair that is outside the defined avoid band; generate commands for the actuators based on the rotational speeds; modify the commands including those of the commands for the pair of the actuators based on the at least one biased rotational speed; and send the commands to the actuators to cause the actuators to drive the rotors according to the commands, and including those of the commands that are modified so that the pair of the actuators are caused to drive the respective rotors at the at least one biased rotational speed, instead of at the rotational speed.

Clause 2. The apparatus of clause 1, wherein the rotors of the vehicle are at least six in number.

Clause 3. The apparatus of clause 1 or clause 2, wherein the rotors of the vehicle are at least eight in number.

Clause 4. The apparatus of any of clauses 1 to 3, wherein the pair of the rotors are immediately adjacent rotors.

Clause 5. The apparatus of any of clauses 1 to 4, wherein the pair of the rotors are immediately adjacent rotors in a direction of a yaw axis of the vehicle.

Clause 6. The apparatus of any of clauses 1 to 5, wherein the pair of the rotors are immediately adjacent rotors in a direction of a pitch axis of the vehicle.

Clause 7. The apparatus of any of clauses 1 to 6, wherein the pair of the rotors are immediately adjacent rotors in a direction of a roll axis of the vehicle.

Clause 8. The apparatus of any of clauses 1 to 7, wherein sides of the vehicle are defined with respect to a roll axis of the vehicle, and the respective rotors of the pair of the rotors are immediately adjacent and located on one side of the vehicle.

Clause 9. The apparatus of any of clauses 1 to 8, wherein sides of the vehicle are defined with respect to a roll axis of the vehicle, and the respective rotors of the pair of the rotors are immediately adjacent and located on respective sides of the vehicle.

Clause 10. The apparatus of any of clauses 1 to 9, wherein the processing circuitry is configured to execute the computer-readable program code to cause the apparatus to further at least: receive a control input that indicates the controlled movement of the vehicle; and determine an attitude of the vehicle, and wherein the rotational speeds are determined based on the control input and the attitude of the vehicle.

Clause 11. The apparatus of any of clauses 1 to 10, wherein the defined avoid band of rotational speeds is defined to include the rotational speeds at which rotor loads exceed a defined load limit, caused by harmonic vibratory forces generated by the rotors at the rotational speeds being in resonance natural frequencies of the rotors.

Clause 12. The apparatus of any of clauses 1 to 11, wherein the rotational speed is biased an amount that is defined based on a width of the defined avoid band.

Clause 13. The apparatus of clause 12, wherein the rotational speed is biased the amount that is defined based on the width of the defined avoid band, with an additional margin on either end of the defined avoid band.

Clause 14. The apparatus of any of clauses 1 to 13, wherein the defined avoid band is bounded by a first rotational speed and a second rotational speed, and the at least one biased rotational speed includes biased rotational speeds for the respective rotors of the pair that are outside the defined avoid band, and wherein a first of the biased rotational speeds is closer to the first rotational speed than the second rotational speed of the defined avoid band, and a second of the biased rotational speeds is closer to the second rotational speed than the first rotational speed.

Clause 15. The apparatus of any of clauses 1 to 14, wherein the at least one biased rotational speed includes biased rotational speeds for the respective rotors of the pair that are outside the defined avoid band, and the apparatus caused to bias the rotational speed includes the apparatus caused to increase the rotational speed by an amount to produce a first of the biased rotational speeds, and decrease the rotational speed by the amount to produce a second of the biased rotational speeds.

Clause 16. The apparatus of any of clauses 1 to 15, wherein the processing circuitry is configured to execute the computer-readable program code to cause the apparatus to further bias a second rotational speed for a second pair of the rotors to produce at least one second biased rotational speed for respective rotors of the second pair of the rotors, and wherein the apparatus caused to modify the commands further includes the apparatus caused to modify those of the commands for the second pair of the actuators based on the at least one second biased rotational speed.

Clause 17. The apparatus of clause 16, wherein the second pair of the rotors are immediately adjacent rotors.

Clause 18. The apparatus of clause 16 or clause 17, wherein the second pair of the rotors are immediately adjacent rotors in a direction of a yaw axis of the vehicle.

Clause 19. The apparatus of any of clauses 16 to 18, wherein the second pair of the rotors are immediately adjacent rotors in a direction of a pitch axis of the vehicle.

Clause 20. The apparatus of any of clauses 16 to 19, wherein the second pair of the rotors are immediately adjacent rotors in a direction of a roll axis of the vehicle.

Clause 21. The apparatus of any of clauses 16 to 20, wherein sides of the vehicle are defined with respect to a roll axis of the vehicle, and the respective rotors of the second pair of the rotors are immediately adjacent and located on one side of the vehicle.

Clause 22. The apparatus of any of clauses 16 to 21, wherein sides of the vehicle are defined with respect to a roll axis of the vehicle, and the respective rotors of the second pair of the rotors are immediately adjacent and located on respective sides of the vehicle.

Clause 23. The apparatus of any of clauses 16 to 22, wherein the pair of the rotors are immediately adjacent the second pair of the rotors.

Clause 24. The apparatus of any of clauses 16 to 23, wherein the pair of the rotors are immediately adjacent the second pair of the rotors in a direction of a yaw axis of the vehicle.

Clause 25. The apparatus of any of clauses 16 to 24, wherein the pair of the rotors are immediately adjacent the second pair of the rotors in a direction of a pitch axis of the vehicle.

Clause 26. The apparatus of any of clauses 16 to 25, wherein the pair of the rotors are immediately adjacent the second pair of the rotors in a direction of a roll axis of the vehicle.

Clause 27. The apparatus of any of clauses 16 to 26, wherein sides of the vehicle are defined with respect to a roll axis of the vehicle, and the pair and the second pair of the rotors are located on one side of the vehicle.

Clause 28. The apparatus of any of clauses 16 to 27, wherein sides of the vehicle are defined with respect to a roll axis of the vehicle, the respective rotors of the pair of the rotors are located on respective sides of the vehicle, and the respective rotors of the second pair of the rotors are located on the respective sides of the vehicle.

Clause 29. The apparatus of any of clauses 16 to 28, wherein the at least one biased rotational speed includes a first increased rotational speed and a first decreased rotational speed, and the at least one second biased rotational speed includes a second increased rotational speed and a second decreased rotational speed.

Clause 30. The apparatus of clause 29, wherein the pair of the rotors includes a first rotor and a second rotor that are immediately adjacent respective ones of a third rotor and a fourth rotor of the second pair in a direction of a roll axis of the vehicle, and wherein the first rotor and the second rotor are driven to respectively the first increased rotational speed and the first decreased rotational speed, and the third rotor and the fourth rotor are driven to respectively the second decreased rotational speed and the second increased rotational speed.

Clause 31. The apparatus of clause 29 or clause 30, wherein the first increased rotational speed and the first decreased rotational speed differ from the rotational speed by a first amount, and the second increased rotational speed and the second decreased rotational speed differ from the second rotational speed by a second amount that is equal to the first amount.

Clause 32. The apparatus of any of clauses 29 to 31, wherein the first increased rotational speed and the first decreased rotational speed differ from the rotational speed by a first amount, and the second increased rotational speed and the second decreased rotational speed differ from the second rotational speed by a second amount that is different from first amount.

Clause 33. A method of operating a vehicle that includes rotors driven by actuators to cause the vehicle to move, the method comprising: determining rotational speeds at which to the rotors to achieve a controlled movement of the vehicle, the rotational speeds including a rotational speed for a rotor of a pair of the rotors driven by a pair of the actuators; monitoring the rotational speed to detect that the rotational speed has approached or reached a defined avoid band of rotational speeds; biasing the rotational speed to produce at least one biased rotational speed for respective rotors of the pair that is outside the defined avoid band; generating commands for the actuators based on the rotational speeds; modifying the commands including those of the commands for the pair of the actuators based on the at least one biased rotational speed; and sending the commands to the actuators to cause the actuators to drive the rotors according to the commands, and including those of the commands that are modified so that the pair of the actuators are caused to drive the respective rotors at the at least one biased rotational speed, instead of at the rotational speed.

Clause 34. The method of clause 33, wherein the rotors of the vehicle are at least six in number.

Clause 35. The method of clause 33 or clause 34, wherein the rotors of the vehicle are at least eight in number.

Clause 36. The method of any of clauses 33 to 35, wherein the pair of the rotors are immediately adjacent rotors.

Clause 37. The method of any of clauses 33 to 36, wherein the pair of the rotors are immediately adjacent rotors in a direction of a yaw axis of the vehicle.

Clause 38. The method of any of clauses 33 to 37, wherein the pair of the rotors are immediately adjacent rotors in a direction of a pitch axis of the vehicle.

Clause 39. The method of any of clauses 33 to 38, wherein the pair of the rotors are immediately adjacent rotors in a direction of a roll axis of the vehicle.

Clause 40. The method of any of clauses 33 to 39, wherein sides of the vehicle are defined with respect to a roll axis of the vehicle, and the respective rotors of the pair of the rotors are immediately adjacent and located on one side of the vehicle.

Clause 41. The method of any of clauses 33 to 40, wherein sides of the vehicle are defined with respect to a roll axis of the vehicle, and the respective rotors of the pair of the rotors are immediately adjacent and located on respective sides of the vehicle.

Clause 42. The method of any of clauses 33 to 41, wherein the method further comprises: receiving a control input that indicates the controlled movement of the vehicle; and determining an attitude of the vehicle, and wherein the rotational speeds are determined based on the control input and the attitude of the vehicle.

Clause 43. The method of any of clauses 33 to 42, wherein the defined avoid band of rotational speeds is defined to include the rotational speeds at which rotor loads exceed a defined load limit, caused by harmonic vibratory forces generated by the rotors at the rotational speeds being in resonance natural frequencies of the rotors.

Clause 44. The method of any of clauses 33 to 43, wherein the rotational speed is biased an amount that is defined based on a width of the defined avoid band.

Clause 45. The method of clause 44, wherein the rotational speed is biased the amount that is defined based on the width of the defined avoid band, with an additional margin on either end of the defined avoid band.

Clause 46. The method of any of clauses 33 to 45, wherein the defined avoid band is bounded by a first rotational speed and a second rotational speed, and the at least one biased rotational speed includes biased rotational speeds for the respective rotors of the pair that are outside the defined avoid band, and wherein a first of the biased rotational speeds is closer to the first rotational speed than the second rotational speed of the defined avoid band, and a second of the biased rotational speeds is closer to the second rotational speed than the first rotational speed.

Clause 47. The method of any of clauses 33 to 46, wherein the at least one biased rotational speed includes biased rotational speeds for the respective rotors of the pair that are outside the defined avoid band, and biasing the rotational speed includes increasing the rotational speed by an amount to produce a first of the biased rotational speeds, and decreasing the rotational speed by the amount to produce a second of the biased rotational speeds.

Clause 48. The method of any of clauses 33 to 47, wherein the method further comprises biasing a second rotational speed for a second pair of the rotors to produce at least one second biased rotational speed for respective rotors of the second pair of the rotors, and wherein modifying the commands further includes modifying those of the commands for the second pair of the actuators based on the at least one second biased rotational speed.

Clause 49. The method of clause 48, wherein the second pair of the rotors are immediately adjacent rotors.

Clause 50. The method of clause 48 or clause 49, wherein the second pair of the rotors are immediately adjacent rotors in a direction of a yaw axis of the vehicle.

Clause 51. The method of any of clauses 48 to 50, wherein the second pair of the rotors are immediately adjacent rotors in a direction of a pitch axis of the vehicle.

Clause 52. The method of any of clauses 48 to 51, wherein the second pair of the rotors are immediately adjacent rotors in a direction of a roll axis of the vehicle.

Clause 53. The method of any of clauses 48 to 52, wherein sides of the vehicle are defined with respect to a roll axis of the vehicle, and the respective rotors of the second pair of the rotors are immediately adjacent and located on one side of the vehicle.

Clause 54. The method of any of clauses 48 to 53, wherein sides of the vehicle are defined with respect to a roll axis of the vehicle, and the respective rotors of the second pair of the rotors are immediately adjacent and located on respective sides of the vehicle.

Clause 55. The method of any of clauses 48 to 54, wherein the pair of the rotors are immediately adjacent the second pair of the rotors.

Clause 56. The method of any of clauses 48 to 55, wherein the pair of the rotors are immediately adjacent the second pair of the rotors in a direction of a yaw axis of the vehicle.

Clause 57. The method of any of clauses 48 to 56, wherein the pair of the rotors are immediately adjacent the second pair of the rotors in a direction of a pitch axis of the vehicle.

Clause 58. The method of any of clauses 48 to 57, wherein the pair of the rotors are immediately adjacent the second pair of the rotors in a direction of a roll axis of the vehicle.

Clause 59. The method of any of clauses 48 to 58, wherein sides of the vehicle are defined with respect to a roll axis of the vehicle, and the pair and the second pair of the rotors are located on one side of the vehicle.

Clause 60. The method of any of clauses 48 to 59, wherein sides of the vehicle are defined with respect to a roll axis of the vehicle, the respective rotors of the pair of the rotors are located on respective sides of the vehicle, and the respective rotors of the second pair of the rotors are located on the respective sides of the vehicle.

Clause 61. The method of any of clauses 48 to 60, wherein the at least one biased rotational speed includes a first increased rotational speed and a first decreased rotational speed, and the at least one second biased rotational speed includes a second increased rotational speed and a second decreased rotational speed.

Clause 62. The method of clause 61, wherein the pair of the rotors includes a first rotor and a second rotor that are immediately adjacent respective ones of a third rotor and a fourth rotor of the second pair in a direction of a roll axis of the vehicle, and wherein the first rotor and the second rotor are driven to respectively the first increased rotational speed and the first decreased rotational speed, and the third rotor and the fourth rotor are driven to respectively the second decreased rotational speed and the second increased rotational speed.

Clause 63. The method of clause 61 or clause 62, wherein the first increased rotational speed and the first decreased rotational speed differ from the rotational speed by a first amount, and the second increased rotational speed and the second decreased rotational speed differ from the second rotational speed by a second amount that is equal to the first amount.

Clause 64. The method of any of clauses 61 to 63, wherein the first increased rotational speed and the first decreased rotational speed differ from the rotational speed by a first amount, and the second increased rotational speed and the second decreased rotational speed differ from the second rotational speed by a second amount that is different from first amount. Clause 65. A computer-readable storage medium for operating a vehicle that includes rotors driven by actuators to cause the vehicle to move, the computer-readable storage medium being non-transitory and having computer-readable program code stored therein that, in response to execution by processing circuitry, causes an apparatus to at least: determine rotational speeds at which to the rotors to achieve a controlled movement of the vehicle, the rotational speeds including a rotational speed for a rotor of a pair of the rotors driven by a pair of the actuators; monitor the rotational speed to detect that the rotational speed has approached or reached a defined avoid band of rotational speeds; bias the rotational speed to produce at least one biased rotational speed for respective rotors of the pair that is outside the defined avoid band; generate commands for the actuators based on the rotational speeds; modify the commands including those of the commands for the pair of the actuators based on the at least one biased rotational speed; and send the commands to the actuators to cause the actuators to drive the rotors according to the commands, and including those of the commands that are modified so that the pair of the actuators are caused to drive the respective rotors at the at least one biased rotational speed, instead of at the rotational speed.

Clause 66. The computer-readable storage medium of clause 65, wherein the rotors of the vehicle are at least six in number.

Clause 67. The computer-readable storage medium of clause 65 or clause 66, wherein the rotors of the vehicle are at least eight in number.

Clause 68. The computer-readable storage medium of any of clauses 65 to 67, wherein the pair of the rotors are immediately adjacent rotors.

Clause 69. The computer-readable storage medium of any of clauses 65 to 68, wherein the pair of the rotors are immediately adjacent rotors in a direction of a yaw axis of the vehicle.

Clause 70. The computer-readable storage medium of any of clauses 65 to 69, wherein the pair of the rotors are immediately adjacent rotors in a direction of a pitch axis of the vehicle.

Clause 71. The computer-readable storage medium of any of clauses 65 to 70, wherein the pair of the rotors are immediately adjacent rotors in a direction of a roll axis of the vehicle.

Clause 72. The computer-readable storage medium of any of clauses 65 to 71, wherein sides of the vehicle are defined with respect to a roll axis of the vehicle, and the respective rotors of the pair of the rotors are immediately adjacent and located on one side of the vehicle.

Clause 73. The computer-readable storage medium of any of clauses 65 to 72, wherein sides of the vehicle are defined with respect to a roll axis of the vehicle, and the respective rotors of the pair of the rotors are immediately adjacent and located on respective sides of the vehicle.

Clause 74. The computer-readable storage medium of any of clauses 65 to 73, wherein the computer-readable storage medium has further computer-readable program code stored therein that, in response to execution by the processing circuitry, causes the apparatus to further at least: receive a control input that indicates the controlled movement of the vehicle; and determine an attitude of the vehicle, and wherein the rotational speeds are determined based on the control input and the attitude of the vehicle.

Clause 75. The computer-readable storage medium of any of clauses 65 to 74, wherein the defined avoid band of rotational speeds is defined to include the rotational speeds at which rotor loads exceed a defined load limit, caused by harmonic vibratory forces generated by the rotors at the rotational speeds being in resonance natural frequencies of the rotors.

Clause 76. The computer-readable storage medium of any of clauses 65 to 75, wherein the rotational speed is biased an amount that is defined based on a width of the defined avoid band.

Clause 77. The computer-readable storage medium of clause 76, wherein the rotational speed is biased the amount that is defined based on the width of the defined avoid band, with an additional margin on either end of the defined avoid band.

Clause 78. The computer-readable storage medium of any of clauses 65 to 77, wherein the defined avoid band is bounded by a first rotational speed and a second rotational speed, and the at least one biased rotational speed includes biased rotational speeds for the respective rotors of the pair that are outside the defined avoid band, and wherein a first of the biased rotational speeds is closer to the first rotational speed than the second rotational speed of the defined avoid band, and a second of the biased rotational speeds is closer to the second rotational speed than the first rotational speed.

Clause 79. The computer-readable storage medium of any of clauses 65 to 78, wherein the at least one biased rotational speed includes biased rotational speeds for the respective rotors of the pair that are outside the defined avoid band, and the apparatus caused to bias the rotational speed includes the apparatus caused to increase the rotational speed by an amount to produce a first of the biased rotational speeds, and decrease the rotational speed by the amount to produce a second of the biased rotational speeds.

Clause 80. The computer-readable storage medium of any of clauses 65 to 79, wherein the computer-readable storage medium has further computer-readable program code stored therein that, in response to execution by the processing circuitry, causes the apparatus to further bias a second rotational speed for a second pair of the rotors to produce at least one second biased rotational speed for respective rotors of the second pair of the rotors, and wherein the apparatus caused to modify the commands further includes the apparatus caused to modify those of the commands for the second pair of the actuators based on the at least one second biased rotational speed.

Clause 81. The computer-readable storage medium of clause 80, wherein the second pair of the rotors are immediately adjacent rotors.

Clause 82. The computer-readable storage medium of clause 80 or clause 81, wherein the second pair of the rotors are immediately adjacent rotors in a direction of a yaw axis of the vehicle.

Clause 83. The computer-readable storage medium of any of clauses 80 to 82, wherein the second pair of the rotors are immediately adjacent rotors in a direction of a pitch axis of the vehicle.

Clause 84. The computer-readable storage medium of any of clauses 80 to 83, wherein the second pair of the rotors are immediately adjacent rotors in a direction of a roll axis of the vehicle.

Clause 85. The computer-readable storage medium of any of clauses 80 to 84, wherein sides of the vehicle are defined with respect to a roll axis of the vehicle, and the respective rotors of the second pair of the rotors are immediately adjacent and located on one side of the vehicle.

Clause 86. The computer-readable storage medium of any of clauses 80 to 85, wherein sides of the vehicle are defined with respect to a roll axis of the vehicle, and the respective rotors of the second pair of the rotors are immediately adjacent and located on respective sides of the vehicle.

Clause 87. The computer-readable storage medium of any of clauses 80 to 86, wherein the pair of the rotors are immediately adjacent the second pair of the rotors.

Clause 88. The computer-readable storage medium of any of clauses 80 to 87, wherein the pair of the rotors are immediately adjacent the second pair of the rotors in a direction of a yaw axis of the vehicle.

Clause 89. The computer-readable storage medium of any of clauses 80 to 88, wherein the pair of the rotors are immediately adjacent the second pair of the rotors in a direction of a pitch axis of the vehicle.

Clause 90. The computer-readable storage medium of any of clauses 80 to 89, wherein the pair of the rotors are immediately adjacent the second pair of the rotors in a direction of a roll axis of the vehicle.

Clause 91. The computer-readable storage medium of any of clauses 80 to 90, wherein sides of the vehicle are defined with respect to a roll axis of the vehicle, and the pair and the second pair of the rotors are located on one side of the vehicle.

Clause 92. The computer-readable storage medium of any of clauses 80 to 91, wherein sides of the vehicle are defined with respect to a roll axis of the vehicle, the respective rotors of the pair of the rotors are located on respective sides of the vehicle, and the respective rotors of the second pair of the rotors are located on the respective sides of the vehicle.

Clause 93. The computer-readable storage medium of any of clauses 80 to 92, wherein the at least one biased rotational speed includes a first increased rotational speed and a first decreased rotational speed, and the at least one second biased rotational speed includes a second increased rotational speed and a second decreased rotational speed.

Clause 94. The computer-readable storage medium of clause 93, wherein the pair of the rotors includes a first rotor and a second rotor that are immediately adjacent respective ones of a third rotor and a fourth rotor of the second pair in a direction of a roll axis of the vehicle, and wherein the first rotor and the second rotor are driven to respectively the first increased rotational speed and the first decreased rotational speed, and the third rotor and the fourth rotor are driven to respectively the second decreased rotational speed and the second increased rotational speed.

Clause 95. The computer-readable storage medium of clause 93 or clause 94, wherein the first increased rotational speed and the first decreased rotational speed differ from the rotational speed by a first amount, and the second increased rotational speed and the second decreased rotational speed differ from the second rotational speed by a second amount that is equal to the first amount.

Clause 96. The computer-readable storage medium of any of clauses 93 to 95, wherein the first increased rotational speed and the first decreased rotational speed differ from the rotational speed by a first amount, and the second increased rotational speed and the second decreased rotational speed differ from the second rotational speed by a second amount that is different from first amount.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive: sense only and not for purposes of limitation.

What is claimed is:

1. An apparatus for operating a vehicle that includes rotors driven by actuators to cause the vehicle to move, the apparatus comprising:
   a memory configured to store computer-readable program code; and
   processing circuitry configured to access the memory, and execute the computer-readable program code to cause the apparatus to at least:
   determine rotational speeds at which to drive the rotors to achieve a controlled movement of the vehicle, the rotational speeds including a rotational speed for a rotor of a pair of the rotors driven by a pair of the actuators;
   monitor the rotational speed to detect that the rotational speed has approached or reached a defined avoid band of rotational speeds;
   bias the rotational speed to produce at least one biased rotational speed for respective rotors of the pair that is outside the defined avoid band;
   generate commands for the actuators based on the rotational speeds;
   modify the commands including those of the commands for the pair of the actuators based on the at least one biased rotational speed; and
   send the commands to the actuators to cause the actuators to drive the rotors according to the commands, and including those of the commands that are modified so that the pair of the actuators are caused to drive the respective rotors at the at least one biased rotational speed, instead of at the rotational speed.

2. The apparatus of claim 1, wherein the pair of the rotors are immediately adjacent rotors in a direction of a yaw axis or a pitch axis of the vehicle.

3. The apparatus of claim 1, wherein sides of the vehicle are defined with respect to a roll axis of the vehicle, and the respective rotors of the pair of the rotors are immediately adjacent and located on one side of the vehicle.

4. The apparatus of claim 1, wherein sides of the vehicle are defined with respect to a roll axis of the vehicle, and the respective rotors of the pair of the rotors are immediately adjacent and located on respective sides of the vehicle.

5. The apparatus of claim 1, wherein the defined avoid band of rotational speeds is defined to include the rotational speeds at which rotor loads exceed a defined load limit, caused by harmonic vibratory forces generated by the rotors at the rotational speeds being in resonance natural frequencies of the rotors.

6. The apparatus of claim 1, wherein the rotational speed is biased an amount that is defined based on a width of the defined avoid band, with an additional margin on either end of the defined avoid band.

7. The apparatus of claim 1, wherein the at least one biased rotational speed includes biased rotational speeds for the respective rotors of the pair that are outside the defined avoid band, and the apparatus caused to bias the rotational speed includes the apparatus caused to increase the rotational speed by an amount to produce a first of the biased rotational speeds, and decrease the rotational speed by the amount to produce a second of the biased rotational speeds.

8. The apparatus of claim 1, wherein the processing circuitry is configured to execute the computer-readable program code to cause the apparatus to further bias a second rotational speed for a second pair of the rotors to produce at least one second biased rotational speed for respective rotors of the second pair of the rotors, and
   wherein the apparatus caused to modify the commands further includes the apparatus caused to modify those of the commands for the second pair of the actuators based on the at least one second biased rotational speed.

9. The apparatus of claim 8, wherein the pair of the rotors are immediately adjacent the second pair of the rotors in a direction of a roll axis of the vehicle, sides of the vehicle are defined with respect to the roll axis, and the pair and the second pair of the rotors are located on one side of the vehicle.

10. The apparatus of claim 8, wherein the pair of the rotors are immediately adjacent the second pair of the rotors in a direction of a roll axis of the vehicle, sides of the vehicle are defined with respect to the roll axis, the respective rotors of the pair of the rotors are located on respective sides of the vehicle, and the respective rotors of the second pair of the rotors are located on the respective sides of the vehicle.

11. The apparatus of claim 8, wherein the at least one biased rotational speed includes a first increased rotational speed and a first decreased rotational speed, and the at least one second biased rotational speed includes a second increased rotational speed and a second decreased rotational speed.

12. The apparatus of claim 11, wherein the pair of the rotors includes a first rotor and a second rotor that are immediately adjacent respective ones of a third rotor and a fourth rotor of the second pair in a direction of a roll axis of the vehicle, and
   wherein the first rotor and the second rotor are driven to respectively the first increased rotational speed and the first decreased rotational speed, and the third rotor and the fourth rotor are driven to respectively the second decreased rotational speed and the second increased rotational speed.

13. A method of operating a vehicle that includes rotors driven by actuators to cause the vehicle to move, the method comprising:
   determining rotational speeds at which to drive the rotors to achieve a controlled movement of the vehicle, the rotational speeds including a rotational speed for a rotor of a pair of the rotors driven by a pair of the actuators;

monitoring the rotational speed to detect that the rotational speed has approached or reached a defined avoid band of rotational speeds;

biasing the rotational speed to produce at least one biased rotational speed for respective rotors of the pair that is outside the defined avoid band;

generating commands for the actuators based on the rotational speeds;

modifying the commands including those of the commands for the pair of the actuators based on the at least one biased rotational speed; and sending the commands to the actuators to cause the actuators to drive the rotors according to the commands, and including those of the commands that are modified so that the pair of the actuators are caused to drive the respective rotors at the at least one biased rotational speed, instead of at the rotational speed.

14. The method of claim 13, wherein the pair of the rotors are immediately adjacent rotors in a direction of a yaw axis or a pitch axis of the vehicle.

15. The method of claim 13, wherein sides of the vehicle are defined with respect to a roll axis of the vehicle, and the respective rotors of the pair of the rotors are immediately adjacent and located on one side of the vehicle.

16. The method of claim 13, wherein sides of the vehicle are defined with respect to a roll axis of the vehicle, and the respective rotors of the pair of the rotors are immediately adjacent and located on respective sides of the vehicle.

17. The method of claim 13, wherein the defined avoid band of rotational speeds is defined to include the rotational speeds at which rotor loads exceed a defined load limit, caused by harmonic vibratory forces generated by the rotors at the rotational speeds being in resonance natural frequencies of the rotors.

18. The method of claim 13, wherein the rotational speed is biased an amount that is defined based on a width of the defined avoid band, with an additional margin on either end of the defined avoid band.

19. The method of claim 13, wherein the at least one biased rotational speed includes biased rotational speeds for the respective rotors of the pair that are outside the defined avoid band, and biasing the rotational speed includes increasing the rotational speed by an amount to produce a first of the biased rotational speeds, and decreasing the rotational speed by the amount to produce a second of the biased rotational speeds.

20. The method of claim 13, wherein the method further comprises biasing a second rotational speed for a second pair of the rotors to produce at least one second biased rotational speed for respective rotors of the second pair of the rotors, and wherein modifying the commands further includes modifying those of the commands for the second pair of the actuators based on the at least one second biased rotational speed.

* * * * *